United States Patent
Lindblad

(10) Patent No.: US 10,402,713 B1
(45) Date of Patent: *Sep. 3, 2019

(54) RF TRANSPONDER ON ADHESIVE TRANSFER TAPE

(71) Applicant: Automated Assembly Corporation, Lakeville, MN (US)

(72) Inventor: Scott Lindblad, Chaska, MN (US)

(73) Assignee: Automated Assembly Corporation, Lakeville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/233,756

(22) Filed: Dec. 27, 2018

Related U.S. Application Data

(63) Continuation-in-part of application No. 14/067,527, filed on Oct. 30, 2013, now Pat. No. 10,169,698.

(51) Int. Cl.
| | |
|---|---|
| *G06K 19/06* | (2006.01) |
| *G06K 19/077* | (2006.01) |
| *B31D 1/02* | (2006.01) |
| *H01Q 1/22* | (2006.01) |

(52) U.S. Cl.
CPC ....... *G06K 19/07718* (2013.01); *B31D 1/021* (2013.01); *B31D 1/028* (2013.01); *G06K 19/07745* (2013.01); *G06K 19/07749* (2013.01); *H01Q 1/2225* (2013.01)

(58) Field of Classification Search
CPC . B24D 15/10; G06K 19/077; G06K 19/07745
USPC ........................................ 235/487, 488, 492
See application file for complete search history.

(56) References Cited

U.S. PATENT DOCUMENTS

| | | |
|---|---|---|
| 6,140,146 A | 10/2000 | Brady et al. |
| 6,259,408 B1 | 7/2001 | Brady et al. |
| 6,478,229 B1 | 11/2002 | Epstein |
| 6,951,596 B2 | 10/2005 | Green et al. |
| 6,986,826 B2 | 1/2006 | Dronzek, Jr. |
| 7,102,520 B2 | 9/2006 | Liu et al. |
| 7,240,873 B2 | 7/2007 | Eikmeier et al. |
| 7,868,766 B2 | 1/2011 | Gengel et al. |
| 7,901,533 B2 | 3/2011 | Steidinger |
| 7,922,094 B2 | 4/2011 | Banerjee et al. |
| 8,430,324 B2 | 4/2013 | Baba et al. |
| 8,448,871 B2 | 5/2013 | Hioki |
| 10,169,698 B1 * | 1/2019 | Lindblad ............ G06K 19/0776 |
| 2002/0155243 A1 | 10/2002 | Kobe et al. |
| 2003/0136503 A1 | 7/2003 | Green et al. |
| 2008/0007409 A1 | 1/2008 | Ferry et al. |
| 2010/0001862 A1 | 1/2010 | Wilson et al. |
| 2011/0101107 A1 | 5/2011 | Kessler |
| 2011/0114734 A1 | 5/2011 | Tiedmann et al. |

(Continued)

FOREIGN PATENT DOCUMENTS

WO     2007000407 A2     1/2007

*Primary Examiner* — Daniel St. Cyr
(74) *Attorney, Agent, or Firm* — Crawford Maunu PLLC

(57) ABSTRACT

The disclosed transponder arrangement includes adhesive transfer tape and an RF transponder. The adhesive transfer tape includes an adhesive layer disposed directly on a release liner, and the release liner is separable from the adhesive layer. An antenna is adhered directly to the adhesive layer, and an RF transponder is disposed on the adhesive layer and coupled to the antenna. A layer of ink is disposed directly on one of the first adhesive surface or the second adhesive surface.

27 Claims, 5 Drawing Sheets

(56) References Cited

U.S. PATENT DOCUMENTS

2011/0241834 A1 10/2011 McAllister et al.
2013/0099003 A1 4/2013 Tarantino et al.
2014/0121557 A1 5/2014 Gannon et al.

* cited by examiner

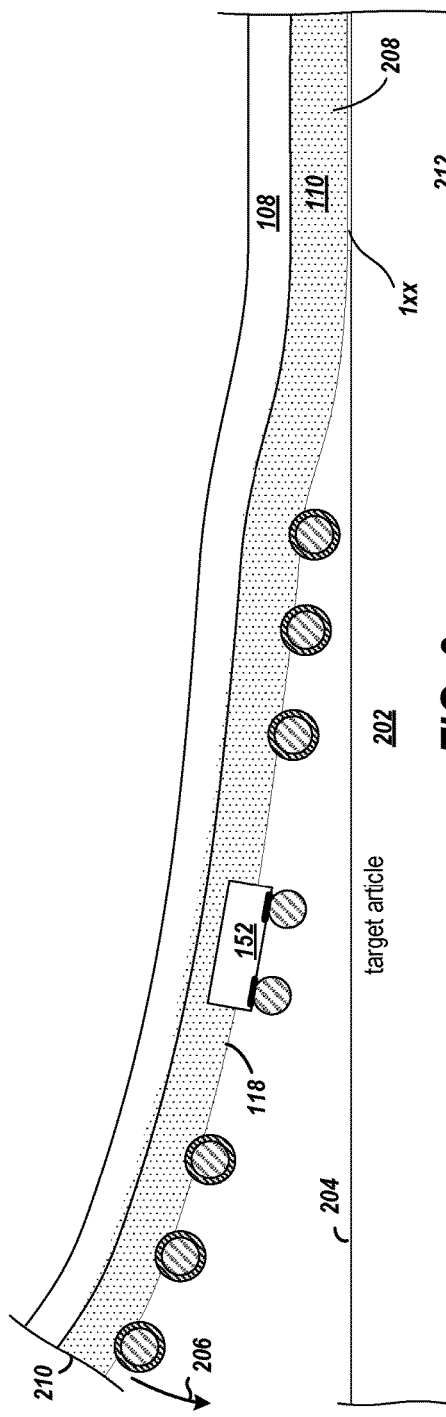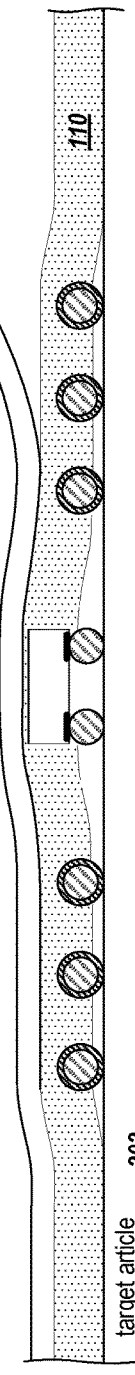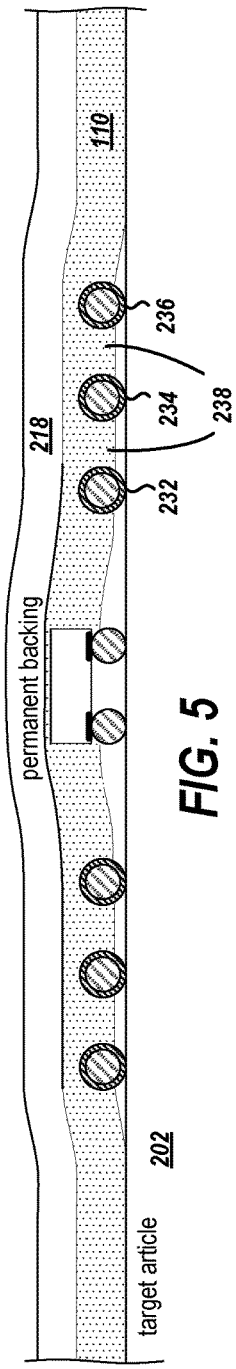

RF TRANSPONDER ON ADHESIVE TRANSFER TAPE

FIELD OF THE INVENTION

The disclosure generally relates to approaches for delivering electronics on adhesive transfer tape.

BACKGROUND

There are a number of applications in which electronics are attached to various articles. The electronics may provide a function that is ancillary to the function of the article or may work in conjunction with the article to provide a desired function. Radio frequency identification (RFID) and near-field communication are examples of such applications.

RFID applications vary from inventory control to traffic management to pet identification. RFID systems generally include readers and tags. RFID tags are affixed to the articles to be tracked, and the RFID reader emits a signal to activate the RFID tag. The RFID tag may respond by reading data from a memory and emitting a signal with the desired information for the RFID reader. For some applications, RF transponders are mounted on a flexible substrate such as those made from polyamides or polyimides. Prior to mounting the electronic device, wiring patterns may be formed on the substrate using a print-and-etch process. The wiring patterns are laid out to accommodate placement of one or more devices on the substrate at desired locations.

Making RFID tags using a polyamide or polyimide substrate may be prohibitively expensive for some applications. The expense is attributable in part to the print-and-etch processes used in creating the wiring pattern. Expensive chemicals are required for print-and-etch processes, and hazardous waste is a byproduct.

SUMMARY

In one implementation a transponder arrangement includes adhesive transfer tape and an RF transponder. The adhesive transfer tape includes an adhesive layer having opposing first and second adhesive surfaces and at least one release liner. The at least one release liner is separable from the adhesive layer and directly adhered to the first and second adhesive surfaces. An antenna adhered is directly to the second adhesive surface, and an RF transponder is disposed on the second adhesive surface and coupled to the antenna. A layer of ink is disposed directly on one of the first adhesive surface or the second adhesive surface.

In another implementation, a roll of transponder arrangements includes adhesive transfer tape and a plurality of transponder arrangements. The adhesive transfer tape includes at least one release liner having an adhesive layer disposed directly thereon, and the adhesive layer has opposing first and second adhesive surfaces. The at least one release liner is separable from the adhesive layer and directly adhered to the first and second adhesive surfaces, with separation leaving the adhesive layer intact. A plurality of transponder arrangements are disposed directly on the second adhesive surface. Each transponder arrangement includes an antenna adhered directly to the second adhesive surface and an RF transponder disposed on the second adhesive surface and coupled to the antenna. A layer of ink is disposed directly on one of the first adhesive surface or the second adhesive surface. The at least one release liner, adhesive layer, and plurality of transponder arrangements are coiled into a roll.

A method of making a roll of transponder arrangements includes unrolling a portion of an adhesive transfer tape from a first roll. The adhesive transfer tape includes at least one release liner and an adhesive layer disposed directly on the at least one release liner, and the adhesive layer has opposing first and second adhesive surfaces. The unrolling separates the second adhesive surface from the at least one release liner, exposing the second adhesive surface, and leaving the at least one release liner adhered to the first adhesive surface. RF transponders are attached to the second adhesive surface on the unrolled portion of the adhesive transfer tape. Antennas are directly attached to the second adhesive surface on the unrolled portion of the adhesive transfer tape, and the antennas are coupled to the RF transponders, respectively. A layer of ink is applied directly on one of the first adhesive surface or the second adhesive surface. The unrolled portion of the adhesive transfer tape having the transponder arrangements is rolled on to a second roll, which attaches the second adhesive surface to the at least one release liner.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings in which:

FIG. 3 is a cross-sectional view of a transponder arrangement on an adhesive transfer tape being affixed to a target article;

FIG. 4 is a cross-sectional view of a transponder arrangement on an adhesive transfer tape having been affixed to a target article and the release liner being removed from the adhesive transfer tape;

FIG. 5 is a cross-sectional view of a transponder arrangement adhered to the adhesive layer from an adhesive transfer tape having been affixed to a target article, having had the release liner removed from the adhesive transfer tape, and having a permanent backing affixed to the adhesive layer;

DETAILED DESCRIPTION OF THE DRAWINGS

Figure 1:
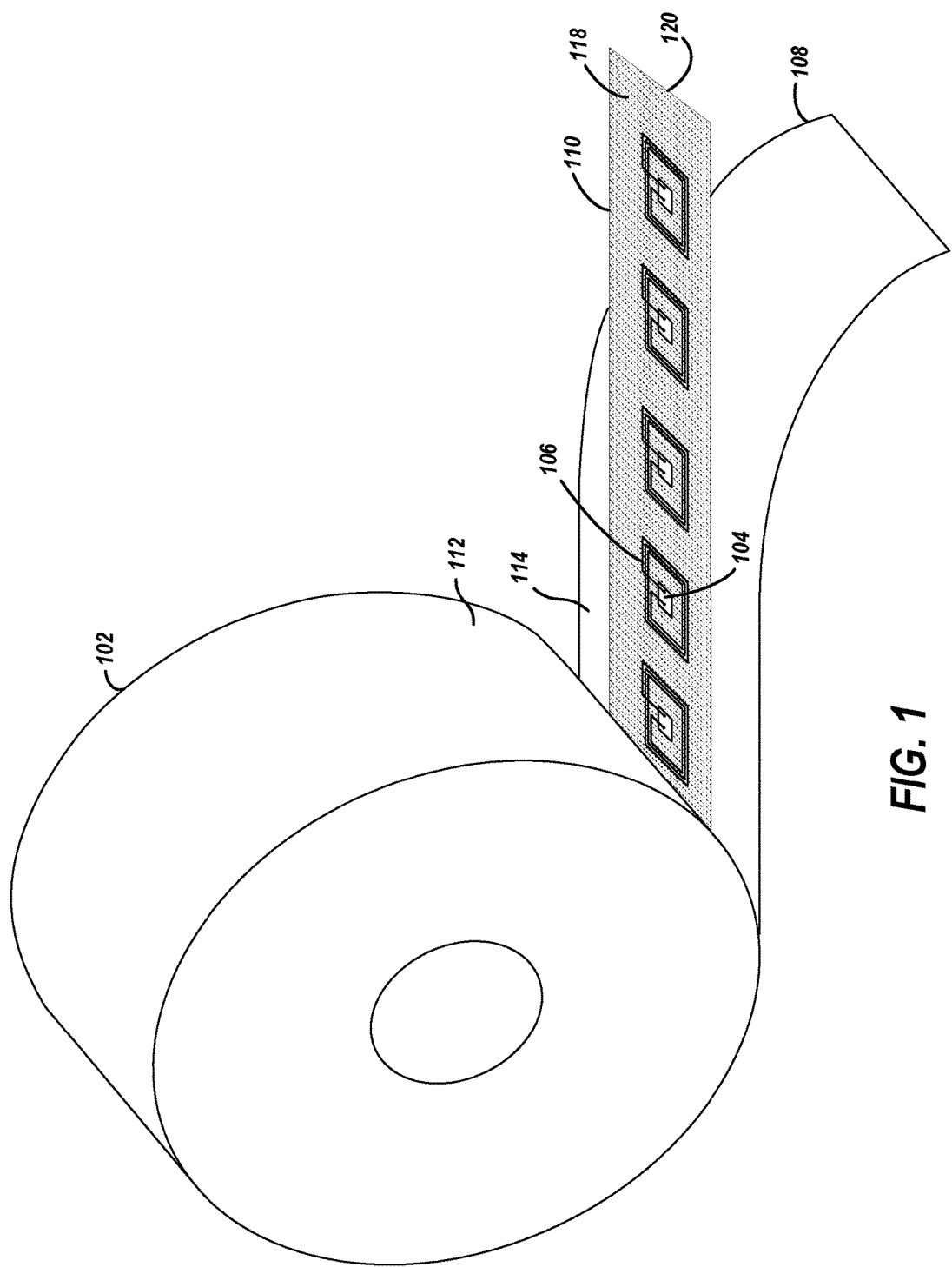
FIG. 1 shows a roll of adhesive transfer tape in which multiple transponder arrangements are affixed directly to the adhesive on the tape.

In conventional applications, adhesive transfer tape provides a mechanism for applying a strip of adhesive to a target article. The adhesive strip has two opposing adhesive surfaces for attaching one object to another. The adhesive strip of the adhesive transfer tape may optionally have an embedded web for reinforcement.

In a departure from conventional uses of adhesive transfer tape, electronic devices and communication and/or power wiring for the devices are directly attached to the adhesive layer on the adhesive transfer tape. There are no backing or substrates for the devices and wiring other than the adhesive layer itself.

The arrangements described herein provide convenient manners of delivering an electronic device, which can then be affixed to a desired article. In one approach, an electronic device is affixed to an adhesive transfer tape. The adhesive transfer tape has an adhesive layer disposed directly on a first release liner. Electrical wiring for power and/or communication is directly adhered to the adhesive layer of the adhesive transfer tape. The electronic device is also disposed on the adhesive layer, either directly or mounted on a strap, which is directly adhered to the adhesive layer. The adhesive layer is separable from the release liner without destruction of the adhesive layer, the adherence of the wiring and electronic device to the adhesive layer, or the coupling of the wiring to the electronic device. A layer of ink is disposed directly on the adhesive layer and can provide a variety of different functions. For example, the layer of ink can have reflective properties to enhance visibility or reduce heat absorption. The layer of ink can include guide marks for use in aligning with another structure or indicating cut lines. The layer of ink can include other coded information useful for picking, placing, storing, communication of descriptive information, or adhering the RF transponders on the adhesive transfer tape to another structure.

As further described in the following paragraphs, an example of the type of electronic device that may be affixed to the adhesive of an adhesive transfer tape is an RF transponder for RFID or near field communication applications. An adhesive transfer tape having RF transponders is well suited for RFID or near field communication applications. Providing the electronic devices and wiring directly on the adhesive of adhesive transfer tape is much less costly than deploying the circuitry on flexible substrates such as polyamide or polyimide. Also, the adhesive transfer tape provides flexibility in manufacturing in that the adhesive with the electronics can be easily applied to application-specific backings or target articles. The structure also enhances tamper resistance since the electronic device and wiring are backed only by the adhesive. An attempt to remove the device and wiring from an article to which the adhesive, device, and wiring are affixed would likely destroy the wiring and/or connections to the device.

FIG. 1 shows a roll 102 of adhesive transfer tape in which multiple transponder arrangements are affixed directly to the adhesive on the tape. Five transponder arrangements are illustrated on an unrolled portion of the adhesive transfer tape. Additional transponder arrangements are disposed on the rolled portion of the adhesive transfer tape and are not visible. Each transponder arrangement includes an antenna and an RF transponder. For example, one of the transponder arrangements includes RF transponder 104 and antenna 106.

In each transponder arrangement, the antenna 106 is adhered directly to the adhesive layer 110. The RF transponder 104 may either be directly adhered to the adhesive layer or mounted on a strap (not shown), which is directly adhered to the adhesive layer.

The adhesive transfer tape includes a release liner 108 and an adhesive layer 110. The release liner 108 is coated on both of surfaces 112 and 114 with release agents to create a differential release. That is, more force is required to separate the adhesive layer from surface 114 of the release liner than is required to separate the adhesive layer from surface 112 of the release liner.

The transponder arrangements may be easily applied to target articles. As the roll of adhesive transfer tape is unrolled, a section of the adhesive transfer tape having an individual transponder arrangement may be cut or otherwise separated from the tape. The individual transponder arrangement may then be attached to a target article by forcing the exposed surface 118 of the adhesive against a surface of the target article. The target article thereby provides a protective backing for one surface of the transponder arrangement. The release liner on the separated section of adhesive transfer tape may then be removed and a protective covering may be adhered to the exposed surface of the adhesive layer.

A layer of ink (not shown) is directly disposed on one or both of surfaces 118 and 120 of the adhesive layer. Note that surface 120 is obscured in the figure. The layer of ink may cover the entire surface of the adhesive layer or leave portions of the adhesive surface exposed for better adherence to a target article. The ink may be any ink having a suitable carrier and suitable colorants for the application.

Each of the transponder arrangements on the roll may be constructed as shown and described in the following figures.

Figure 2A:
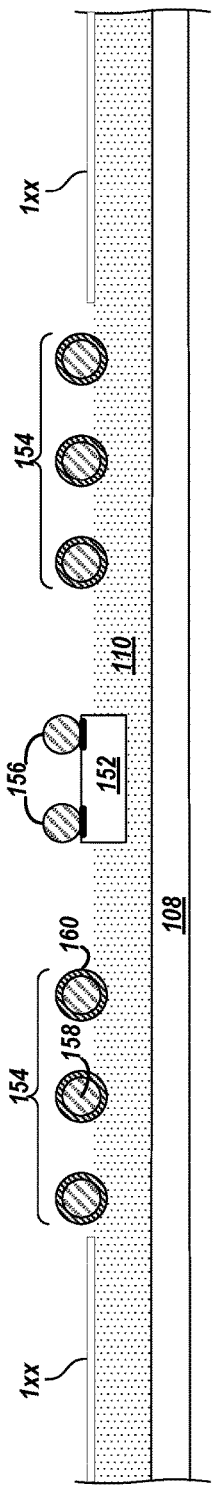
FIG. 2A is a cross-sectional view of a transponder arrangement on an adhesive transfer tape, along with a layer of ink on one surface of an adhesive layer.

FIG. 2A is a cross-sectional view of a transponder arrangement on an adhesive transfer tape. The adhesive transfer tape includes release liner 108 and adhesive layer 110. The RF transponder 152 is directly adhered to the adhesive layer as is the antenna wiring 154. Terminal ends 156 of the antenna wiring are connected to the RF transponder.

In an example implementation, the adhesive layer 110 is a pressure-sensitive adhesive. This allows the RF transponder 152 and antenna wiring 154 to be easily affixed to the adhesive transfer tape by forcing the RF transponder and antenna wiring against the surface of the adhesive layer. Also, each transponder arrangement and the section of adhesive from the adhesive transfer tape may be easily affixed to a target article.

The configuration of the antenna wiring 154 may vary according to design and application requirements. For example, the antenna wiring may be bare wire or wire 158 with an insulating coating 160 as shown. It will be appreciated that wire as used herein does not refer to printed or printed-and-etched patterns of conductive material. Rather, as used herein, wire refers to one or more strands of conductive material that have been made by drawing the conductive material through draw plates, for example. In one embodiment, the antenna wiring 154 is a fine gauge bare wire. For example, 44 gauge (AWG) copper wire has been found to be suitable for some applications. However, different gauges may be suitable for different applications. Though a coil antenna is shown, it will be recognized that the disclosed structures are adaptable for any of the many different antenna patterns known in the art and suitable for RFID and near field communication applications.

The transponder arrangement of FIG. 2A includes a layer of ink 162 disposed on one of the surfaces of the adhesive layer 110. The layer of ink may cover the entire surface of the adhesive layer or leave portions of the adhesive surface exposed for better adherence to a target article. The ink may be any ink having a suitable carrier and suitable colorants for the application.

Figure 2B:
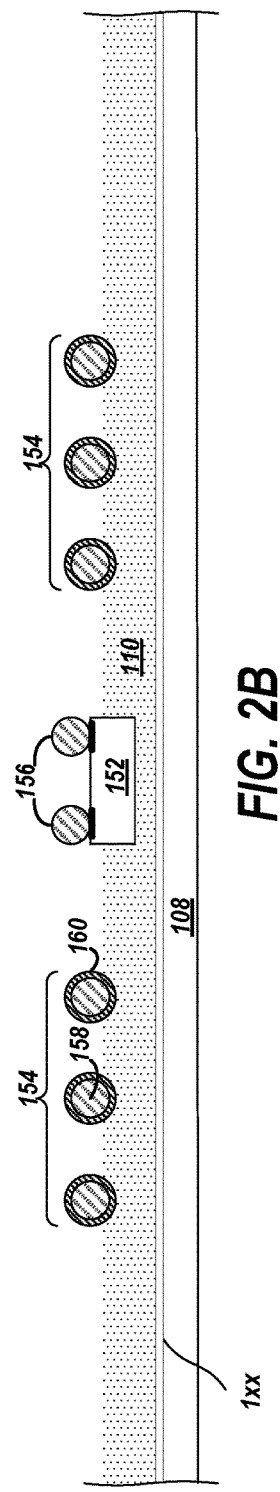
FIG. 2B is a cross-sectional view of a transponder arrangement on an adhesive transfer tape, along with a layer of ink on another surface of an adhesive layer.

FIG. 2B shows an alternative to the transponder arrangement of FIG. 2A. The transponder arrangement of FIG. 2B has a layer of ink disposed on the surface of the adhesive layer that is adjacent to the release liner 108.

Figure 2C:
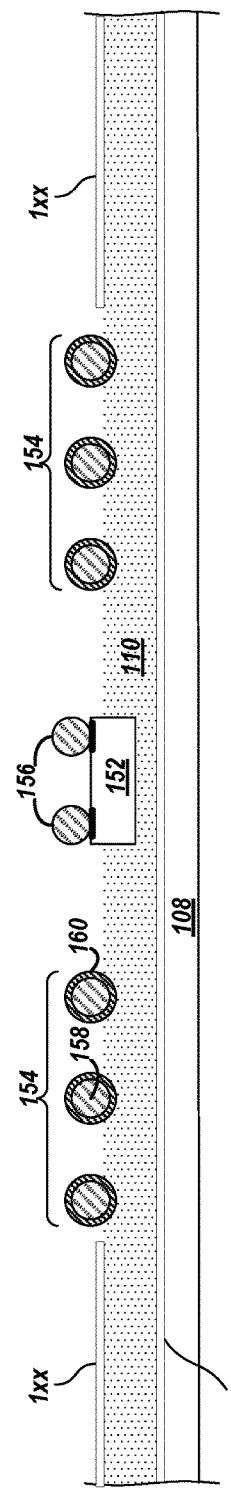
FIG. 2C is a cross-sectional view of a transponder arrangement on an adhesive transfer tape, along with layers of ink on both surfaces of an adhesive layer.

FIG. 2C shows an alternative to the transponder arrangement of FIG. 2A. The transponder arrangement of FIG. 2C has a layer of ink disposed and a layer of ink disposed on the surface of the adhesive layer that is adjacent to the release liner 108.

FIGS. 3, 4, and 5 show a sequence in which a transponder arrangement on an adhesive transfer tape is affixed to a target article.

FIG. 3 is a cross-sectional view of a transponder arrangement on an adhesive transfer tape being affixed to a target article 202. The exposed surface 118 of the adhesive layer 110 faces surface 204 of the target article 202 and the adhesive transfer tape with the transponder arrangement is forced against the target article in the direction shown by arrow 206. The adhesive surrounding the transponder arrangement, for example, the portion 208 of the adhesive layer and the adhesive beyond line 210 on the adhesive transfer tape, attaches the tape and transponder arrangement to the article.

The target article is application dependent. For example, the target article may be a card-sized substrate, a product or product package, a windshield, luggage, or myriad other objects.

FIG. 4 is a cross-sectional view of a transponder arrangement on an adhesive transfer tape having been affixed to a target article and the release liner being removed from the adhesive transfer tape. Once the adhesive transfer tape with the transponder arrangement is affixed to the target article 202, the release liner 108 may be removed from the adhesive layer 110 by peeling the release liner in the direction of arrow 212.

FIG. 5 is a cross-sectional view of a transponder arrangement adhered to the adhesive layer from an adhesive transfer tape having been affixed to a target article, having had the release liner removed from the adhesive transfer tape, and having a permanent backing affixed to the adhesive layer. After the release liner 108 (FIG. 4) has been removed from the adhesive layer 110, a permanent backing 218 may be affixed to the adhesive layer 110. Though the permanent backing is shown as a thin layer of material, it will be recognized that different dimensions and types of materials may be suitable for different application and design requirements.

It will be appreciated that different antenna configurations will result in different portions of the adhesive layer contacting the target article and the permanent backing. For a tightly wound antenna coil no adhesive would contact the target article between adjacent loops of the coil. For example, if loops 232, 234, and 236 were closer together, then adhesive portions 238 would not attach to the surface of the target article. However, for a coil in which adjacent loops are sufficiently separated, the adhesive portions 238 would attach to the target article between the loops.

Figure 6:
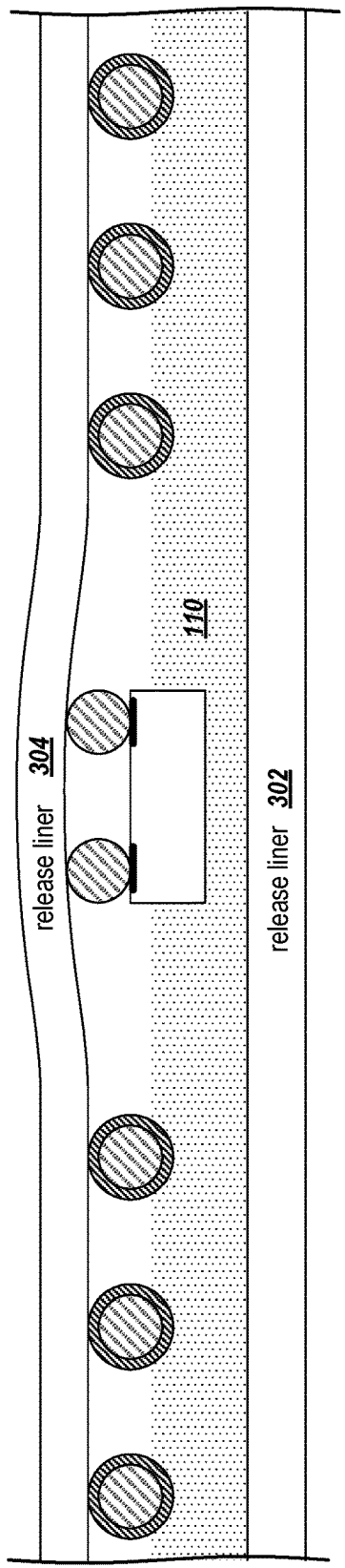
FIG. 6 is a cross-sectional view of a transponder arrangement on an adhesive transfer tape having two release liners.

FIG. 6 is a cross-sectional view of a transponder arrangement on an adhesive transfer tape having two release liners. Rather than the single release liner 108 of the implementation shown in FIG. 2, the adhesive transfer tape has two release liners, release liner 302 and release liner 304. The surface of release liner 302 that is directly in contact with the adhesive layer 110 is coated with a first release agent, and the surface of release liner 304 that is directly in contact with the adhesive layer is coated with a second release agent. The different release agents create a differential release between release liners 302 and 304 and the adhesive layer 110.

The transponder arrangement of FIG. 6 can have a layer of ink (not shown) on either one or both of the surfaces of the adhesive layer 110.

Figure 7:
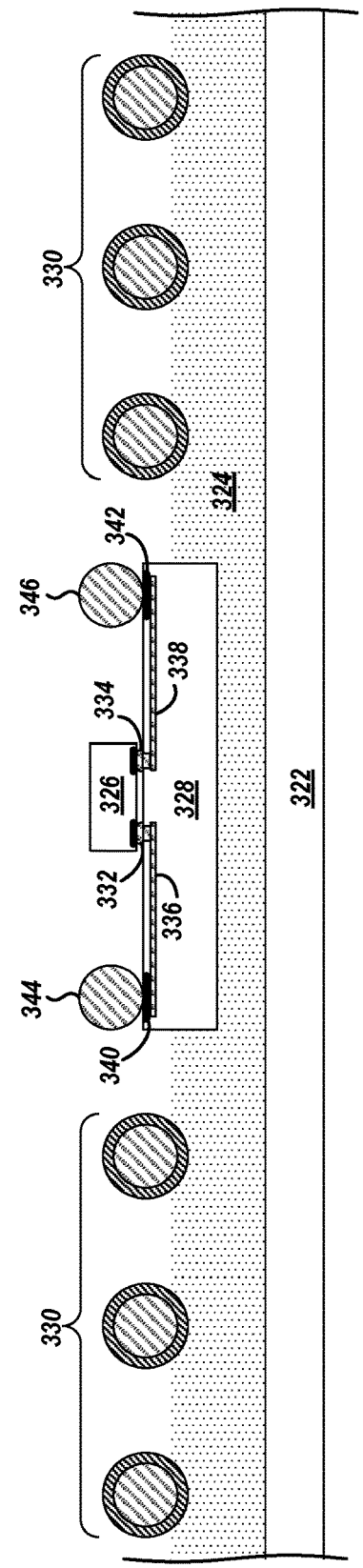
FIG. 7 is a cross-sectional view of a transponder arrangement on an adhesive transfer tape where the RF transponder is disposed on a strap.

FIG. 7 is a cross-sectional view of a transponder arrangement on an adhesive transfer tape where the RF transponder is disposed on a strap. The adhesive transfer tape includes release liner 322 and adhesive layer 324. The transponder arrangement, which is directly disposed on the adhesive layer, includes RF transponder 326, strap 328, and antenna wiring 330. The RF transponder is directly attached to a surface of the strap and is coupled to the antenna wiring via the strap.

The strap 328 is directly attached to the adhesive layer 324. The RF transponder 326 is attached to contact pads 332 and 334 on the strap by soldered connections, for example. Metal traces 336 and 338 on the strap lead from the contact pads 332 and 334 to terminals 340 and 342. In an example implementation, the RF transponder is connected to the metal traces 336 and 338 by way of conductive vias. The strap may be made from polyamide or polyimide for example. Metal traces may be printed and etched to provide the bond pads for the RF transponder and the terminals for connecting the antenna wiring. In other implementations, the strap may be made from various polyesters, polyethylene naphthalate (PEN), or vinyl, and metal traces may be formed accordingly.

Being on the surface of the strap that faces away from the adhesive layer 324, the terminals 340 and 342 are thereby exposed for connection to leads of the antenna. Terminal end 344 of the antenna wiring 330 is electrically connected to terminal 340 on the strap, and terminal end 346 of the antenna wiring is electrically connected to terminal 342 on the strap. The wire may be soldered to the terminals or attached to the terminals with a conductive adhesive, for example. In an alternative implementation, both of terminals 340 and 342 may be on the same side of the RF transponder rather than on opposite sides as shown.

The strap may reduce manufacturing costs. The process of connecting the antenna wiring to the RF transponder may be simplified because the wiring is laid over the exposed terminals on the strap. Instead of having to blindly align terminals of the strap with wiring that had been previously laid out on the substrate, the wires are laid over and connected to the visible terminals on the strap.

The transponder arrangement of FIG. 6 can have a layer of ink (not shown) on either one or both of the surfaces of the adhesive layer 110.

Figure 8:
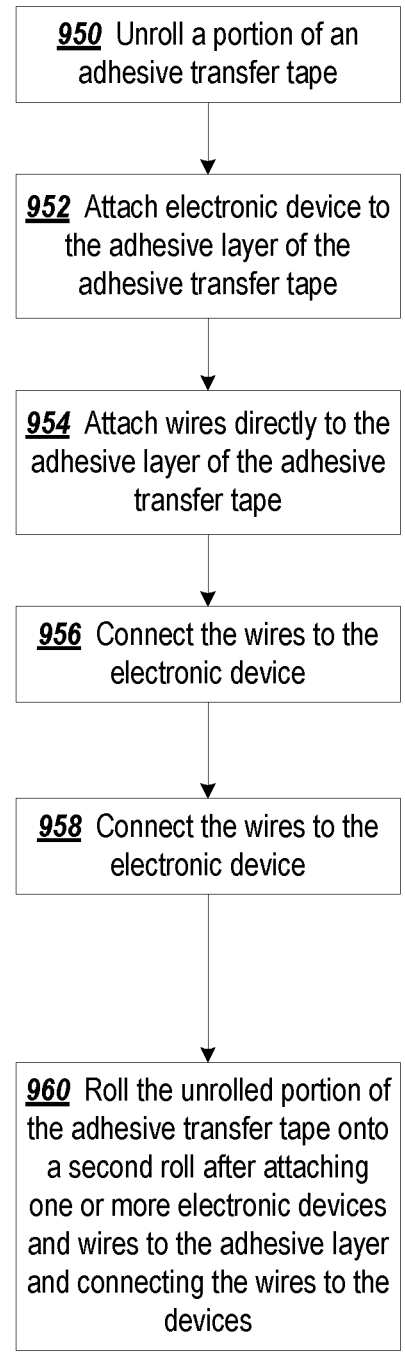
FIG. 8 is a flowchart of a process of making a roll of electronic devices on an adhesive transfer tape.

FIG. 8 is a flowchart of a process of making a roll of electronic devices on an adhesive transfer tape. At block 950 a portion of a first roll of adhesive transfer tape is unrolled, exposing the adhesive layer of the tape on the unrolled portion and leaving the adhesive attached to the release liner. One or more electronic devices, such as RFID transponders, are attached directly to the adhesive layer on the unrolled portion of the tape at block 952. With a pressure-sensitive adhesive, the devices may be attached by forcing the devices against the surface of the adhesive. At block 954, wiring for the devices is attached directly to the adhesive layer, and the wiring is connected to the devices at block 956. The connections may be made by way of low-temperature soldering or with a conductive adhesive. After attaching the devices and the wiring to the adhesive layer and connecting the wiring to the devices on the unrolled portion of the adhesive transfer tape, at block 958 a layer of ink can be deposited on one or both surfaces of the adhesive layer, and at block 960 the unrolled portion is rolled onto a second roll. The process may be repeated and continued until the roll of adhesive transfer tape has been filled with electronic devices. The process of FIG. 13 may be performed using the structures of FIGS. 1-12 according to design and implementation requirements.

Terms such as over, under, top, bottom, above, below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Though aspects and features may in some cases be described in individual figures, it will be appreciated that features from one figure can be combined with features of another figure even though the combination is not explicitly shown or explicitly described as a combination. The embodiments are thought to be applicable to a variety of RFID tags and near field communication applications. Other aspects and embodiments will be apparent to those skilled in the art from consideration of the specification. It is intended that the specification and illustrated embodiments be considered as examples only, with a true scope of the invention being indicated by the following claims.

What is claimed is:

1. A transponder arrangement, comprising:
adhesive transfer tape that includes an adhesive layer having opposing first and second adhesive surfaces and at least one release liner, wherein the at least one release liner is separable from the adhesive layer and directly adhered to the first and second adhesive surfaces;
an antenna adhered directly to the second adhesive surface;
an RF transponder disposed on the second adhesive surface and coupled to the antenna; and
a layer of ink disposed directly on one of the first adhesive surface or the second adhesive surface.

2. The transponder arrangement of claim 1, wherein the at least one release liner includes a first release liner disposed directly on the first adhesive surface and a second release liner disposed directly on the antenna, RF transponder, and the second adhesive surface.

3. The transponder arrangement of claim 2, wherein:
a surface of the first release liner directly in contact with the first adhesive surface is coated with a first release agent;
a surface of the second release liner directly in contact with the second adhesive surface is coated with a second release agent; and
the surface of the first release liner directly in contact with the first adhesive surface has a differential release from the surface of the second release liner directly in contact with the second adhesive surface.

4. The transponder arrangement of claim 1, wherein the RF transponder is adhered directly to the second adhesive surface.

5. The transponder arrangement of claim 1, further comprising:
a strap adhered directly to the second adhesive surface and coupled to the antenna; and
wherein the RF transponder is disposed directly on the strap and is coupled to the antenna via the strap.

6. The transponder arrangement of claim 5, wherein the strap has a first surface, a second surface, and first and second terminals exposed on the first surface, wherein the second surface of the strap is directly adhered to the second adhesive surface, and the antenna is attached to the first and second terminals.

7. The transponder arrangement of claim 1, wherein the first and second adhesive surfaces is include a pressure-sensitive adhesive.

8. The transponder arrangement of claim 1, wherein the antenna is comprised of bare wire adhered directly to the second adhesive surface.

9. The transponder arrangement of claim 1, wherein the antenna is comprised of insulated wire adhered directly to the second adhesive surface.

10. A roll of transponder arrangements, comprising:
adhesive transfer tape that includes at least one release liner having an adhesive layer disposed directly thereon, wherein the adhesive layer has opposing first and second adhesive surfaces, and the at least one release liner is separable from the adhesive layer and directly adhered to the first and second adhesive surfaces, with separation leaving the adhesive layer intact;
a plurality of transponder arrangements disposed directly on the second adhesive surface, each transponder arrangement including:
an antenna adhered directly to the second adhesive surface; and
an RF transponder disposed on the second adhesive surface and coupled to the antenna; and
a layer of ink disposed directly on one of the first adhesive surface or the second adhesive surface;
wherein the at least one release liner, adhesive layer, and plurality of transponder arrangements are coiled into a roll.

11. The roll of transponder arrangements of claim 10, wherein the at least one release liner has a first surface coated with a first release agent and a second surface coated with a second release agent, the first at least one release liner having a differential release between the first and second adhesive surfaces of the at least release liner.

12. The roll of transponder arrangements of claim 10, wherein the at least one release liner includes a first release liner disposed directly on the first adhesive surface and a second release liner disposed directly on the antenna, RF transponder, and the second adhesive surface.

13. The roll of transponder arrangements of claim 12, wherein:
a surface of the first release liner directly in contact with the first adhesive surface is coated with a first release agent;
a surface of the second release liner directly in contact with the second adhesive surface is coated with a second release agent; and
the surface of the first release liner directly in contact with the first adhesive surface has a differential release from the surface of the second release liner directly in contact with the second adhesive surface.

14. The roll of transponder arrangements of claim 10, wherein the RF transponder is adhered directly to the second adhesive surface.

15. The roll of transponder arrangements of claim 10, each transponder arrangement further including:
a strap adhered directly to the second adhesive surface and coupled to the antenna; and
wherein the RF transponder is disposed directly on the strap and is coupled to the antenna via the strap.

16. The roll of transponder arrangements of claim 15, wherein the strap has a first surface, a second surface, and first and second terminals exposed on the first surface, wherein the second surface of the strap is directly adhered to the second adhesive surface, and the antenna is attached to the first and second terminals.

17. The roll of transponder arrangements of claim 10, wherein the first and second adhesive surfaces include a pressure-sensitive adhesive.

18. The roll of transponder arrangements of claim 10, wherein the antenna is comprised of bare wire adhered directly to the second adhesive surface.

19. The roll of transponder arrangements of claim 10, wherein the antenna is comprised of insulated wire adhered directly to the second adhesive surface.

20. A method of making a roll of transponder arrangements, comprising:
   unrolling a portion of an adhesive transfer tape from a first roll, the adhesive transfer tape including at least one release liner and an adhesive layer disposed directly on the at least one release liner, wherein the adhesive layer has opposing first and second adhesive surfaces, and the unrolling separates the second adhesive surface from the at least one release liner, exposing the second adhesive surface, and leaves the at least one release liner adhered to the first adhesive surface;
   attaching RF transponders to the second adhesive surface on the unrolled portion of the adhesive transfer tape;
   attaching antennas directly to the second adhesive surface on the unrolled portion of the adhesive transfer tape;
   coupling the antennas to the RF transponders, respectively;
   applying a layer of ink directly on one of the first adhesive surface or the second adhesive surface; and
   rolling the unrolled portion of the adhesive transfer tape on to a second roll, the rolling attaching the second adhesive surface to the at least one release liner.

21. The method of claim 20, wherein the at least one release liner has a first surface coated with a first release agent and a second surface coated with a second release agent, the at least one release liner having a differential release between the first and second adhesive surfaces layer and the first and second surfaces of the release liner.

22. The method of claim 20, wherein the attaching the RF transponders to the second adhesive surface includes adhering the RF transponders directly to the second adhesive surface.

23. The method of claim 20, wherein:
   the attaching the RF transponders to the second adhesive surface includes:
      adhering straps directly to the second adhesive surface; and
      attaching the RF transponders to the straps, respectively; and
   the coupling the antennas to the RF transponders includes:
      coupling the antennas to the straps, respectively.

24. The method of claim 23, wherein each strap has a first surface, a second surface, and first and second terminals exposed on the first surface, and the second surface of the strap is directly adhered to the second adhesive surface, and the coupling the antennas to the straps includes attaching the antennas to the first and second terminals on the straps.

25. The method of claim 20, wherein the first and second adhesive surfaces include a pressure-sensitive adhesive.

26. The method of claim 20, wherein the antenna is comprised of bare wire adhered directly to the second adhesive surface.

27. The method of claim 20, wherein the antenna is comprised of insulated wire adhered directly to the second adhesive surface.

* * * * *